United States Patent [19]
Eberle

[11] 3,818,008
[45] June 18, 1974

[54] 1-PHENYLHEXAHYDRO-PYRIDAZINES

[75] Inventor: Marcel K. Eberle, Madison, N.J.

[73] Assignee: Sandoz-Wander, Inc., Hanover, N.J.

[22] Filed: Jan. 27, 1972

[21] Appl. No.: 221,381

Related U.S. Application Data

[60] Division of Ser. No. 95,407, Dec. 4, 1970, Pat. No. 3,663,567, which is a continuation-in-part of Ser. No. 866,020, Oct. 13, 1969, abandoned.

[52] U.S. Cl. 260/250 A, 260/239 DD, 260/247.5 B, 260/251 A, 260/268 TR, 260/293.61, 260/310 D, 260/315, 260/326.9, 260/326.5 B, 260/326.85, 424/250
[51] Int. Cl. ..................... C07d 51/04, C07d 27/54
[58] Field of Search ............................... 260/250 A

[56] References Cited
OTHER PUBLICATIONS

Eberle, Chemical Abstract, 75:35731q, (1971).

Wohlgemuth, H., Chemical Abstracts, 9:16027, (1916), Ann. Chim. 2, 403–465, (1915).

Kost, et al., Zhur. Obshchei Khim. 27:3338–3342, (1957); C. A. 52:9071f.

Shabarov, et al., Zhur. Obshchei Khim, 30:2473–2480, (1960); C. A. 55:124136, (1961).

*Primary Examiner*—Nicholas S. Rizzo
*Assistant Examiner*—Ralph D. McCloud
*Attorney, Agent, or Firm*—Richard E. Vila

[57] ABSTRACT

The invention discloses novel process for preparation of N-substituted cycloalkanoindoles including novel compounds of said type exhibiting pharmaceutical activity in animals and also useful as intermediates. Also disclosed are novel 1-phenylhexahydropyridazines useful as intermediates in the process.

2 Claims, No Drawings

1-PHENYLHEXAHYDRO-PYRIDAZINES

This application is a division of Ser. No. 95,407, filed Dec. 4, 1970, now U.S. Letters Patent No. 3,663,567, which Ser. No. 95,407 is a continuation-in-part of Ser. No. 866,020, filed Oct. 13, 1969, now abandoned.

This invention relates to chemical preparations and compounds, and more particularly to novel process for preparation of N-substituted cycloalkanoindoles (also called "carbazoles" in certain situations). The invention also relates to certain novel N-substituted cycloalkanoindoles. The invention further relates to preparation of intermediates for preparations of the N-substituted cycloalkanoindoles prepared by the novel process of the invention.

The N-substituted cycloalkanoindoles prepared by the novel process of the invention possess pharmaceutical activity in animals and are also useful as intermediates in the preparation of compounds also having pharmaceutical activity in animals.

The novel process of the invention is useful for preparation of compounds of the formula I:

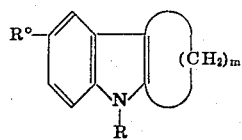

in which
R is from the group of:

a) $-(CH_2)_x-NH_2$, b) $-CH_2-CH-C-NH_2$ and 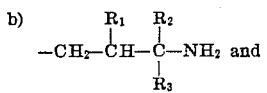  c) $-CH_2-CH_2-CH_2-CH-NH_2$ 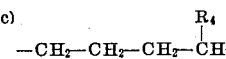

each of $R_1$, $R_2$ and $R_3$ is independently hydrogen of methyl provided that at least one is other than hydrogen and that no more then one of $R_1$ and $R_3$ is other than hydrogen, $R_4$ is methyl, x is 3 or 4, n is 3 to 13, inclusive, and $R°$ is hydrogen, halo of atomic weight of from 19 to 36, lower alkyl of one to three carbon atoms or lower alkoxy of one to three carbon atoms.

The compounds of formula I may be prepared in accordance with the invention by reacting a compound of general formula II from the group of:

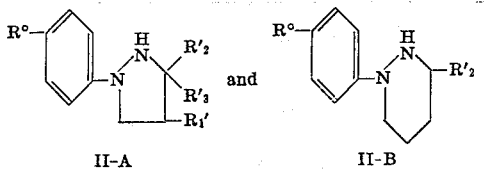

in which
$R°$ is as defined and each of $R_1'$, $R_2'$ and $R_3'$ is independently hydrogen or methyl provided that no more than one of $R_1'$ and $R_3'$ is other than hydrogen,
with a compound of formula III,

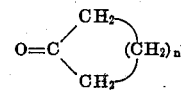

in which n is as above-defined.

The process of the invention is generally carried out at elevated temperatures typically in the range of from 50°C. to 150°C., usually 75°C. to 120°C. The preferred conditions for the reaction may vary depending upon the particular compound desired. In general, it is preferred to carry out the reaction in an organic solvent which is inert under the reaction conditions. For this purpose any of several of the well known organic solvents may be employed. The particular solvent preferred will usually vary with the compound being prepared and the form of starting materials employed. For example, it is generally preferred to employ the compound of formula II in the form of an acid addition such as a hydrohalide, e.g., hydrochloric or hydrobromide, when producing compounds of formula I in which n is 5 or greater. In such situations involving the use of compound II in the form of an acid addition salt it is preferred to employ an inert organic solvent which is a polar solvent. The preferred polar solvents include the lower alkanols of one to five carbon atoms such as ethanol and propanol and the lower carboxylic acids of two to five carbons such as acetic acid and proprionic acid, more preferably acetic acid. The compounds of formula II are preferably employed in free base form when producing the compounds of formula I in which n is 3 or 4, especially the compounds of formula I in which n is 3. When compound II is employed in free base form it is preferred to use as solvent a non-polar organic solvent. The preferred non-polar solvents include the aromatic solvents such as benzene and toluene, more preferably toluene. The molar ratio of compound III to compound II in the process of the invention is not particularly critical and satisfactory results may be obtained at molar ratio in the range of 0.8:1 to 2:1. It is generally preferred to employ a slight excess of the compound IV and the usually preferred molar ratio is in the range of 1.05:1 to 1.4:1. The time for the reaction may vary fairly widely depending upon several factors including particularly to the compound I being produced. Satisfactory results may be usually obtained when the reaction time is in the range of 10 minutes to 5 hours, more usually 20 minutes to 3 hours. Excessive reaction times offer no particular advantage and may result in undesired decomposition of the desired product. The reaction product of formula I may be isolated from the reaction system of the process of the invention by working up by established procedures.

It is not desired to be committed as a part of this invention to any theory of methanism by which the process of this invention operates. It is believed, however, that the process proceeds according to the scheme illustrated below, as follows:

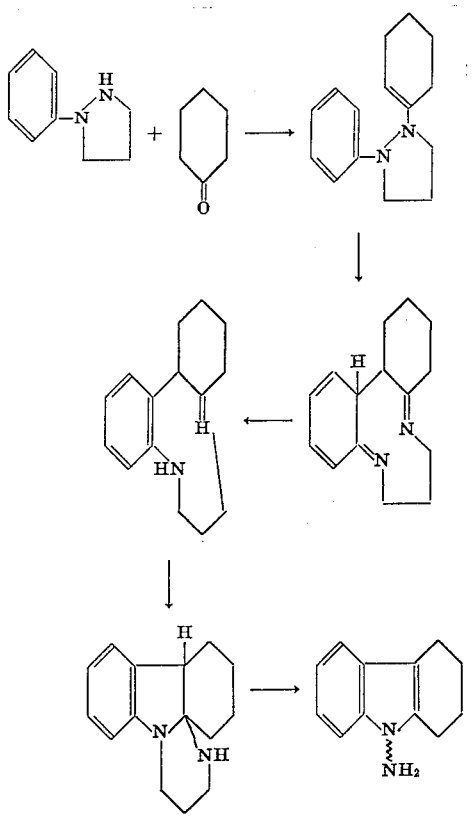

Certain of the compounds of formula II employed as starting material in the process of the invention are either known or may be prepared by established procedures from known materials. Many such compounds as well as others of the formula II are preferably prepared by a process referred to herein as the "Reduction Process" and involving generally in its various embodiments the reduction of a corresponding or related unsaturated compound bearing a carbonyl function and identified herein as having the general formula IV. One preferred embodiment of such reduction process is referred to herein as process RP-A and may be illustrated as follows:

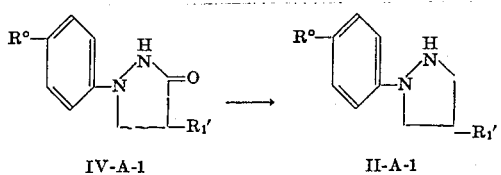

A second preferred embodiment of the reduction process is process RP-B, as follows:

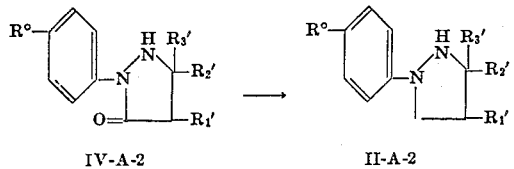

A further preferred embodiment of the reduction process is process RP-C, as follows:

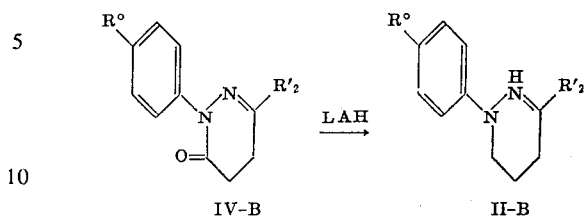

The Reduction Process in general may be suitably carried out with lithium aluminum hydride as reducing agent at temperatures in the range of 20°C. to 120°C., preferably 30°C. to 70°C. Such reduction is carried out in an organic solvent inert under the reaction conditions. Any of several of the well-known organic solvents may be employed for the purpose. The preferred solvents include the acyclic and cyclic ethers such as diethyl ether, tetrahydrofuran and dioxane, especially tetrahydrofuran. It is also possible to carry out the Reduction Process employing an alkali metal such as sodium in the presence of a source of hydrogen such as a lower alcohol, e.g., ethanol, but such known reduction procedures are less preferred for production of compounds II. The product compounds II may be isolated from the Reduction Process by working up by conventional procedures.

Reduction Process RP-C directed to the production of six-membered ring compounds II-B is of interest as are processes II-A-1 and II-A-2 as it was found that the correspondingly unsaturated five-membered ring compound of formula IV-A-2 ($R_2'$ and $R_3'$ being hydrogen) could not be effectively reduced to provide the corresponding compounds of formula II-A-2. Novel compounds produced by the Reduction Process include those of formula II-B.

The compounds of formula IV employed in the Reduction Process and also the compounds III are either known or may be obtained from known materials by established procedures.

The compounds of formula I are useful because they possess pharmacological activity in animals. In particular, the compounds of formula I exhibit central nervous system activity of a depressant order and are useful as sedataives and/or tranquilizers as indicated by behavior tests in mice on administration intraperitoneally. For such use the compounds may be combined with a pharmaceutically acceptable carrier, and such other conventional adjuvants as may be desirable, and administered orally in such forms as tablets, capsules, elixirs, suspensions and the like, or parenterally in the form of an injectable solution or suspension. The dosage administered will of course vary depending upon the compound used and mode of administration. However, in general, satisfactory results are obtained when administered at a daily dosage of from about 1 milligrams to about 200 milligrams per kilogram of body weight, preferably given in divided doses 2 to 4 times a day, or in sustained release form. For most mammals the administration of from about 50 milligrams to about 1,000 milligrams of the compound per day provides satisfactory results and dosage forms suitable for internal administration comprise from about 15 milligrams to about 500 milligrams of the compound in admixture with a solid or liquid pharmaceutical carrier or diluent.

The compounds of formula I may also indicate their depressant effect on the central nervous system in one or more tests in animals indicative of their sedative/tranquilizer activity or of other useful activity associated with a depressive effect on the central nervous system. For example, various of the compounds of formula I may exhibit an antagonism of amphetamine in mice and/or anti-convulsant activity as indicated by an inhibition of chemically induced convulsions in mice. Such effects are also obtained on the administration of daily dosages in the range given above.

The compounds of formula I are also useful as intermediates for the preparation of other compounds having the formula V:

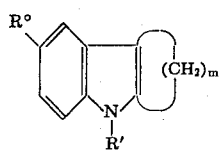     V in which
R' is from the group of:

d) $-(CH_2)_x-Am$ (e)
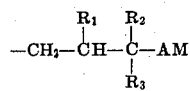

(f)
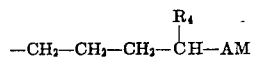

$R°$, $R_1$, $R_2$, $R_3$, $R_4$, n and x are as defined, and Am is a secondary or tertiary amino radical containing no more than eight carbon atoms and from the group of N-mono(lower)alkylamino of one to four carbon atoms, di(lower)alkylamino, monohydroxyalkyl of one to four carbon atoms, di(hydroxy(lower)alkyl)amino, morpholino, piperidino, pyrrolidino and N-alkylpiperazino. The compounds of formula V may be produced from compounds I by procedures well-known in the art for converting an aliphatic primary amine to the various significances of "Am" as defined above including procedures described in U.S. Letters Patent No. 3,282,942. Several of the compounds of formula V, and in particular those in which "Am" as defined above in other than hydroxyalkyl, may, for example, be prepared by reacting the corresponding compound I with a compound of formula VI:

XY     VI in which Y is from the group of lower alkyl of preferably one to four carbon atoms, $-CH_2-CH_2-CH_2-CH_2-X$, $-CH_2-CH_2-CH_2-CH_2-CH_2-X$, $-CH_2-CH_2-O-CH_2-CH_2-X$ and $-CH_2-CH_2-N(lower\ alkyl)-CH_2-CH_2-X$ and X is halogen of atomic weight of from 35 to 127, e.g., bromo and iodo.

The reaction of a compound I with compound VI is conveniently carried out in an organic solvent which is inert under the reaction conditions at a temperature in the range of from 20°C. to 200°C., preferably 50°C. to 150°C. The reaction is desirably carried out in the presence of an acid binding agent such as a tertiary amine e.g., triethylamine, or, preferably, an inorganic base, particularly alkali metal carbonates, e.g., sodium or potassium carbonate. In most situations the compound of formula VI may be conveniently employed in excess as solvent for the reaction. Other organic solvents that may be also employed include dioxane, benzene and toluene. The reaction conditions of the process may be varied to produce compounds in which the aliphatic amine portion of compound I is substituted by either an N-alkylamino or dialkylamino. In general, shorter reaction periods are employed when producing the N-alkylamino derivatives. Longer reaction times and higher temperatures are conditions favoring the production of the dialkylamino derivatives. Techniques conveniently employed in the alkyl halide alkylation of amines may be also employed to advantage in the process. For example, it is within the scope of the process to tosylate the amino group of the compound of formula I prior to alkylation in order to produce compounds of formula V having an N-alkylamino moiety.

However, the compounds of the formula V in which "Am" is a di(identical alkyl)-substituent are preferably obtained by a process which comprises passing hydrogen through a mixture comprising an unsubstituted amine of formula I, an aldehyde of one to four carbon atoms corresponding to the desired substituent, an inert organic solvent and a catalytic amount of platinum or palladium. Suitable reaction temperatures are about 0° to 50°C., preferably 10° to 30°C. Preferred solvents are alcohols corresponding to the aldehyde reactant and the preferred catalyst is platinum. When monoalkyl or mixed alkyl substituents are desired, the amine of formula I may be converted into an amide and the amide consequently reduced to give a monoalkyl substituted product. The amide is preferably prepared by reacting the amine with the halide, especially the chloride, of a carboxylic acid of one to four carbon atoms corresponding to the desired substituent. The reaction may be carried out in an inert organic solvent and is a conventional manner. Preferred reducing agents are lithium aluminum hydride and diborane and the preferred solvent is tetrahydrofuran. Suitable reduction temperatures are about 0° to 90°C., preferably 15° to 80°C. If desired, the "mixed alkylated" compounds may then be prepared by introducing the further alkyl substituent of the monoalkylated product with an aldehyde as described above or by formation of a further amide and consequent reduction.

The compounds of formula V which are hydroxyalkyl substituted may be produced by reacting an amino compound of formula I with an alkylene oxide in conventional manner for hydroxyalkylating primary aliphatic amines as described, for example, in U.S. Pat. No. 3,282,942.

The compounds of formula V also have pharmacological activity in animals as indicated by a depressant effect on the central nervous system in tests in mice, and are useful, for example, as sedatives and/or tranquilizers. Various of the compounds of formula V have also been found of value as anti-depressants and for other uses as indicated in U.S. Pat. Nos. 3,282,942 and 3,329,571. The compounds of formula V may be generally administered to obtain satisfactory results at daily dosages in the range of 0.3 to 200 milligrams per kilogram of animal body weight with daily doses for most mammals being in the range of from 15 to 1,000 milligrams in admixture with a solid or liquid pharmaceutical carrier or diluent.

It will thus be evident from the description herein that the invention provides an efficient chemical route for preparation of compounds described in said U.S. Pat. No. 3,282,942, including especially the compounds herein identified by formula V in which $R^\circ$ is hydrogen and $R'$ is d) as above given, i.e., $R'$ is $—(CH_2)_r—Am$, and particularly those further defined n being 6 and "Am" being dialkylamino, more especially dimethylamino, i.e., the compound 11-(3-dimethylaminopropyl)-cyclooct[b]indole also named as 1-(gamma-dimethylaminopropyl)-2,3-hexamethyleneindole.

The compounds of formulae I and V form acid addition salts and in particular the pharmaceutically acceptable acid addition salts are useful forms in which the compounds may be administered for pharmaceutical use. The pharmaceutically acceptable acid addition salts include by way of illustration the hydrochloride, hydrobromide, maleate and the like. All such acid addition salts are to be considered within the scope of the pharmaceutical useful compounds described herein.

Certain of the compounds of formulae I and V disclosed herein are novel compounds. Thus, novel compounds within the scope of formula I provided hereby may be represented by the following formulae IA, IB and IC:

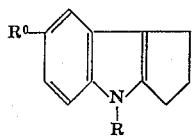

IA

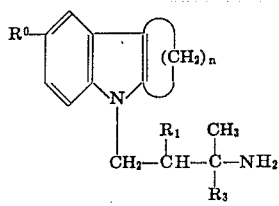

IB and

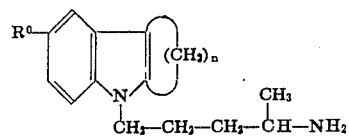

IC in which $R^\circ$, R, $R_1$ $R_3$ and n are as previously defined (but with no more than one of $R_1$ and $R_3$ being other than hydrogen).

The novel compounds within the scope of formula V provided hereby may be represented by the following formulae VA, VB and VC:

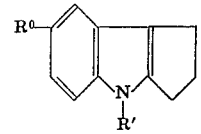

VA

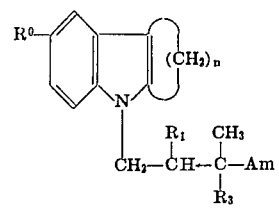

VB

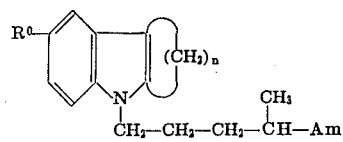

VC in which $R^\circ$, $R'$, $R_2$, $R_3$, and n are as previously defined (but with no more than one of $R_1$ and $R_3$ being other than hydrogen).

For the above mentioned pharmaceutical uses, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby a sustained action over a longer period. Similarly, suspensions, syrups and elixirs may contain the active ingredient in admixture with any of the conventional excipients utilized for the preparation of such compositions, e.g., suspending agents(methylcellulose, tragacanth and sodium alginate), wetting agents(lecithin, polyoxyethylene stearate and polyoxyethylene sorbitan monooleate) and preservatives(ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hardfilled capsules and tablets.

A representative formulation is a tablet prepared by conventional tabletting techniques and containing the following ingredients:

| Ingredient | Weight (mg.) |
| --- | --- |
| "Compound of formula I or V" | 25–50 |
| Tragacanth | 10 |
| Lactose | 197.5 |
| Corn Starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE A

1-Phenylpyrazolidine

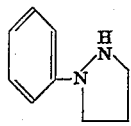

A solution of 50 g. of 1-phenylpyrazolone-3 in 500 ml. of dry tetrahydrofuran is added dropwise to a mixture of 15 g. of lithium aluminum hydride (LAH) in 150 ml. of tetrahydrofuran. The resulting mixture is heated at reflux overnight, cooled, mixed with 500 ml. of diethyl ether and excess LAH destroyed by slow addition of 70 ml. of water. The resulting mixture is filtered and the resulting solid material washed with 300 ml. of diethyl ether and the resulting ether wash and filtrate evaporated in vacuo to dryness to obtain an oil of 1-phenylpyrazolidine which may be readily converted to the hydrochloride salt, m.p. 167°–168°C., and the maleate salt, m.p. 112°–113°C.

EXAMPLE B

4-Methyl-1-phenylpyrazolidine

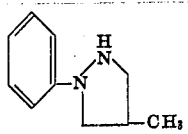

Following the procedure of Example A and employing the appropriate corresponding starting materials in approximately similar proportions there is obtained 4-methyl-1-phenylpyrasolidine hydrochloride, m.p. 202°–204°C.

EXAMPLE C

3-Methyl-1-phenyl-hexahydropyridazine

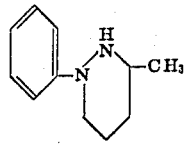

Following the procedure of Example A the compound 3-methyl-1-phenyl-4,5-dihydropyridazine-6(1H)-one is reacted with LAH in approximately similar proportions to obtain 3-methyl-1-phenyl-hexahydropyridazine hydrochloride, m.p. 202°–204°C.

EXAMPLE 1

8-(3-Aminopropyl)-cyclopent[b]indole maleate.

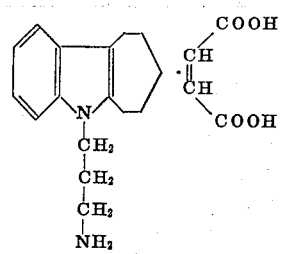

A solution of 4 g. of 1-phenylpyrazolidine, 4 g. of cyclopentanone and 50 ml. of toluene is refluxed under nitrogen for 2 hours and the water separated from the reaction mixture by a Dean-Stark tube during reaction. To the cooled resulting mixture is added 3.1 g. of maleic acid in 20 ml. of methanol to obtain a crystalline material which is filtered off, dissolved in methanol and crystallized therefrom by adding diethyl ether to obtain 8-(3-aminopropyl)-cyclopent[b]indole maleate, m.p. 178°–179°C.

EXAMPLE 2

9-(3-Aminopropyl)-1,2,3,4-tetrahydro-carbazole maleate and hydrochloride.

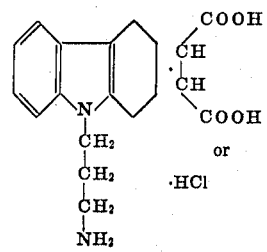

a. Following the procedure of Example 1 and employing the appropriate corresponding starting material in similar proportions there is obtained 9-(3-aminopropyl)-1,2,3,4-tetrahydrocarbazole maleate, m.p. 197°–198°C.

b. The product obtained in (a), above, is readily converted by known procedures to the corresponding hydrochloride salt, m.p. 291°–293°C.

EXAMPLE 3

10-(3-Aminopropyl)-cyclohept[b]indole hydrochloride and maleate.

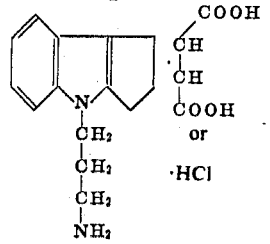

a. A solution of 3.0 g. of 1-phenylpyrazolidine hydrochloride, 3.0 g. of cycloheptanone and 50 ml. of glacial acetic acid is refluxed under nitrogen for 30 minutes. The resulting cooled mixture is treated by addition of 50 ml. of diethyl ether to obtain 10-(3-aminopropyl)-cyclohept[b]indole hydrochloride, m.p. 291°–293°C.

b. There is readily obtained the corresponding maleate, m.p. 184°–185°C. from the above hydrochloride.

EXAMPLE 4

11-(3-Aminopropyl)-cyclooct[b]indole hydrochloride

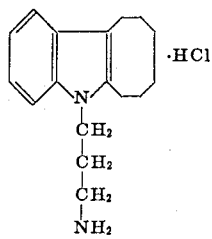

Following the procedure of Example 3 there is obtained 11-(3-aminopropyl)-cyclooct[b]indole hydrochloride; m.p. 243°–245°C.

Also analogously prepared are the following:
a. 8-chloro-11-(3-aminopropyl)-cyclooct[b]indole; m.p. in hydrochloride salt form; 173°–175°C.;
b. 11-(3-aminobutyl)-cyclooct[b]indole; m.p. in hydrochloride salt form; 239°–240°C.;
c. 8-methoxy-11-(3-aminobutyl)-cyclooct[b]indole; m.p. in hydrochloride salt form; 185°C.;
d. 8-methyl-11-(3-aminopropyl)-cyclooct[b]indole;
e. 12-(3-aminobutyl)-cyclonon[b]indole;
f. 13-(3-aminobutyl)-cyclodec[b]indole,
g. 14-(3-aminobutyl)-cycloundec[b]indole; or
h. 15-(3-aminobutyl)-cyclododec[b]indole.

EXAMPLE 5

15-(3-Aminopropyl)-cyclododeca[b]indole hydrochloride and maleate.

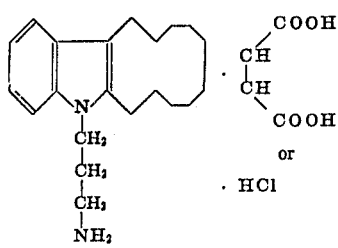

a. Following the procedure of part (a) of Example 13 and employing the appropriate corresponding starting materials in similar proportions there is obtained after drying overnight at 110°C. under vacuum the compound 15-(3-aminopropyl)-cyclododeca[b]indole hydrochloride, m.p. 234°–235°C.

b. There is readily obtained the corresponding maleate, m.p. 169°–170°C. from the above hydrochloride.

EXAMPLE 6

9-(4-Aminopentyl)-1,2,3,4-tetrahydro-carbazole hydrochloride.

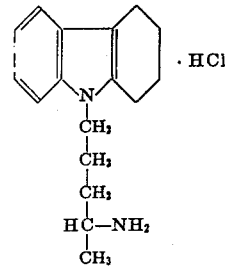

A solution of 2.0 g. of 1-phenyl-3-methyl-hexahydropyridazine hydrochloride, 1.3 g. of cyclohexanone and 50 ml. of glacial acetic acid is refluxed under nitrogen for 12 hours. The cooled resulting mixture is treated with diethyl ether to obtain 9-(4-aminopentyl)-1,2,3,4-tetrahydro-carbasole hydrochloride, m.p. 235°–236°C.

EXAMPLE 7

11-(3-Dimethylaminopropyl)-cyclooct[b]indole hydrochloride and maleate

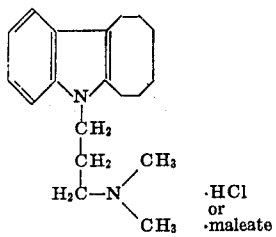

A solution of 1.4 g. of 11-(3-aminopropyl)-cyclooct[b]indole in 100 ml. methanol and 6 ml of a 37 percent aqueous formaldehyde solution is hydrogenated in the presence of 500 mg. of platinum oxide over 2 ¼ days. Removal of the solvent by evaporation in vacuo leaves an oil. The oil is dissolved in a minimum amount of methanol and treated with a methanolic solution of maleic acid. Diethyl ether is then added and the title compound precipitates in crystalline maleate salt form.

The maleate salt form is dissolved in methanol and the solution is treated with hydrogen chloride gas. Addition of diethyl ether causes the title compound to precipitate in crystalline hydrochloride salt form; m.p. 145°C.

What is claimed is:

1. A compound of the formula:

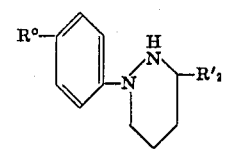

in which $R_2'$ is hydrogen or methyl and $R°$ is hydrogen, halo of atomic weight of from 19 to 36, alkyl of one to three carbon atoms or alkoxy of one to three carbon atoms.

2. The compound of claim 1 in which $R°$ is hydrogen and $R_2'$ is methyl.

* * * * *